United States Patent [19]

Esterowitz et al.

[11] Patent Number: 5,200,966
[45] Date of Patent: Apr. 6, 1993

[54] RESONANTLY PUMPED, ERBIUM-DOPED, GSGG, 2.8 MICRON, SOLID STATE LASER WITH ENERGY RECYCLING AND HIGH SLOPE EFFICIENCY

[75] Inventors: Leon Esterowitz, Springfield; Robert C. Stoneman, Alexandria, both of Va.

[73] Assignee: The United States of America as represented by the Secretary of the Navy, Washington, D.C.

[21] Appl. No.: 883,336

[22] Filed: May 14, 1992

[51] Int. Cl.$^5$ .................. H01S 3/091; H01S 3/092
[52] U.S. Cl. .................................... 372/71; 372/41
[58] Field of Search .................. 372/39, 40, 41, 71

[56] References Cited

U.S. PATENT DOCUMENTS

| | | | |
|---|---|---|---|
| 4,969,154 | 11/1990 | Esterowitz et al. | 372/41 |
| 5,038,353 | 8/1991 | Esterowitz et al. | 372/41 |
| 5,084,880 | 1/1992 | Esterowitz et al. | |
| 5,086,432 | 2/1992 | Esterowitz et al. | |
| 5,107,509 | 4/1992 | Esterowitz et al. | |

OTHER PUBLICATIONS

Stoneman et al., "Laser-pumped 2.8-μm Er$^{3+}$:GSGG laser", *Conference on Lasers and Electro-Optics*, May 14, 1991, pp. 134–135 (CTuO6).

Stoneman et al., "2.8-μm Er$^{3+}$:YLiF, laser resonantly pumped at 970 nm", *SPIE*, vol. 1410 (1991), pp. 148–155.

Stoneman et al., "Direct Upper-State Pumping of the 2.8 μm Er$^{3+}$: YLF Laser", *J. Quantum Electron.*, 28 1041 (1992).

*Primary Examiner*—John D. Lee
*Assistant Examiner*—Robert E. Wise
*Attorney, Agent, or Firm*—Thomas E. McDonnell; George Jameson

[57] ABSTRACT

A laser system and method for producing a laser emission at a wavelength of substantially 2.8 microns and having a quantum efficiency of at least unity and a slope efficiency of about 36%. In a preferred embodiment of the invention, the laser system comprises a laser cavity defined by first and second reflective elements with one of the reflective elements operating as an output coupler; a crystal disposed in the laser cavity and having a GSGG host material doped with a preselected percent concentration of erbium, the GSGG host material and preselected percent concentration of erbium being selected so as to provide a quantum efficiency of at least unity by the $^4I_{13/2} + ^4I_{13/2} \rightarrow ^4I_{9/2} + ^4I_{15/2}$ upconversion process and a slope efficiency of about 36% when the crystal is resonantly pumped; and a resonant pump laser for directly pumping the $^4I_{11/2}$ upper laser state of the erbium with a pump beam to cause the crystal to produce a laser emission corresponding to the $^4I_{11/2} \rightarrow ^4I_{13/2}$ laser transition having a wavelength of substantially 2.8 microns.

19 Claims, 6 Drawing Sheets

RESONANTLY PUMPED, ERBIUM-DOPED, GSGG, 2.8 MICRON, SOLID STATE LASER WITH ENERGY RECYCLING AND HIGH SLOPE EFFICIENCY

BACKGROUND OF THE INVENTION

1. Field of the Invention

The present invention relates to lasers, and particularly to a resonantly pumped, erbium-doped, GSGG, 2.8 micron solid state laser system that produces a recycling process which produces an internal quantum efficiency greater than unity and about a 36% slope efficiency.

2. Description of the Prior Art

It is well known that the human body is comprised of approximately 70% water, with various human tissues containing about 60% to 90% water, and bone and cartilage containing about 30% to 40% water. Since the 2.8 micron wavelength has a substantially maximum absorption in water, this 2.8 micron wavelength is the ideal wavelength to use for a large variety of medical laser applications on the human body. The 2.8 micron wavelength also offers a controlled absorption or penetration depth of, for example, one micron in the human body. As a result, this 2.8 micron wavelength is extremely useful in surgical applications where very precise cuts in area and/or depth are needed while minimizing damage to good tissue, bone and/or cartilage adjacent to, or under, the area to be ablated. A 2.8 micron wavelength laser could be used for precise surgery in such exemplary applications as brain surgery, neurosurgery, ear surgery, eye surgery, plastic surgery, burn treatment, dentistry, and the removal of malignancies.

Current lasers for generating this 2.8 micron wavelength use a variety of host or lasant materials with various pumping techniques for exciting the lasant material. Typically these lasers are flashlamp pumped. Such flashlamp pumped lasers are large, inefficient and expensive.

The development of high power semiconductor lasers has led to renewed interest in resonant pumping of solid state lasers based on rare earth active ions. Most of this research has been confined to the use of gallium arsenide (GaAs) and aluminum gallium arsenide (AlGaAs) semiconductor diode laser devices which perform at high power within the range of 750 to 870 nm (nanometers). These diode lasers have been used to pump $Er^{3+}$ (erbium) at about 800 nm (as well as to pump $Nd^{3+}$ at about 810 nm and $Tm^{3+}$ at about 790 nm). One such diode laser pumped solid state laser is disclosed in U.S. Pat. No. 5,014,279 issued May 7, 1991 to Esterowitz et al. In this patent, an erbium-doped crystal laser is resonantly pumped by a pump beam at about 800 nm from an AlGaAs diode laser to enable the erbium-doped crystal laser to produce a laser emission at substantially 2.8 microns with about a 10% slope efficiency.

Figure 1:
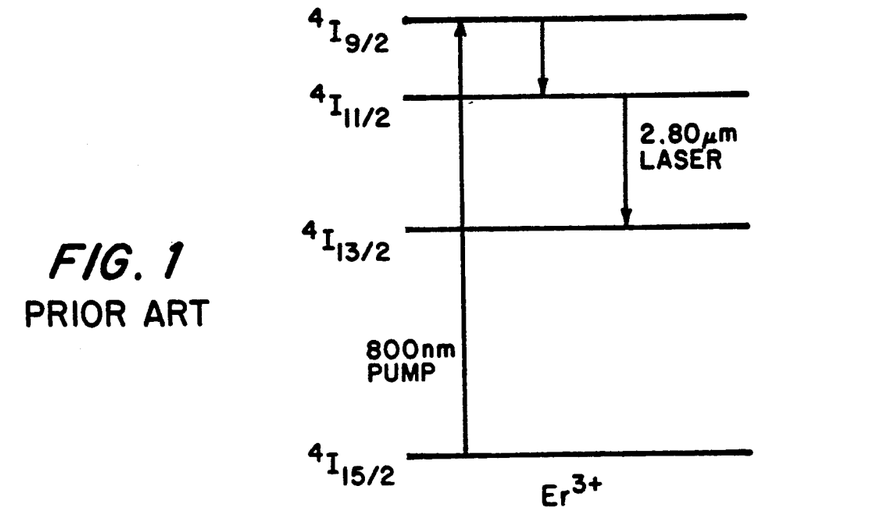
FIG. 1 illustrates the 800 nm resonant pumping diagram for 2.8 micron $Er^{3+}$ laser with a $^4I_{11/2} \rightarrow ^4I_{13/2}$ laser transition.

The 800 nm resonant pumping diagram for the 2.8 micron $Er^{3+}$ $^4I_{11/2} \rightarrow {}^4I_{13/2}$ laser transition is shown in FIG. 1. The $^4I_{9/2}$ state is resonantly pumped by the 800 nm pump beam and the $^4I_{11/2}$ upper laser state is populated as shown through the decay $^4I_{9/2} \rightarrow {}^4I_{11/2}$. The decay of the $^4I_{9/2}$ state is primarily non-radiative. The radiative decay rate from the $^4I_{9/2}$ state is more than two orders of magnitude lower than the non-radiative rate. Therefore, the radiative decay processes $^4I_{9/2} \rightarrow {}^4I_{13/2}$ and $^4I_{9/2} \rightarrow {}^4I_{15/2}$, which would bypass the upper laser state and therefore reduce the efficiency of the 2.8 micron laser, can be ignored. However, there is a power loss experienced in the 800 nm resonant pumping scheme shown in FIG. 1 due to the $^4I_{9/2} \rightarrow {}^4I_{11/2}$ phonon decay. This power loss reduces the slope efficiency in the 800 nm resonant pumping scheme of FIG. 1. More specifically, the theoretical maximum possible slope efficiency for a 2.8 micron laser pumped by the 800 nm resonant pumping scheme of FIG. 1 is given by $\lambda_{pump}/\lambda_{laser} = 28\%$.

Figure 2:
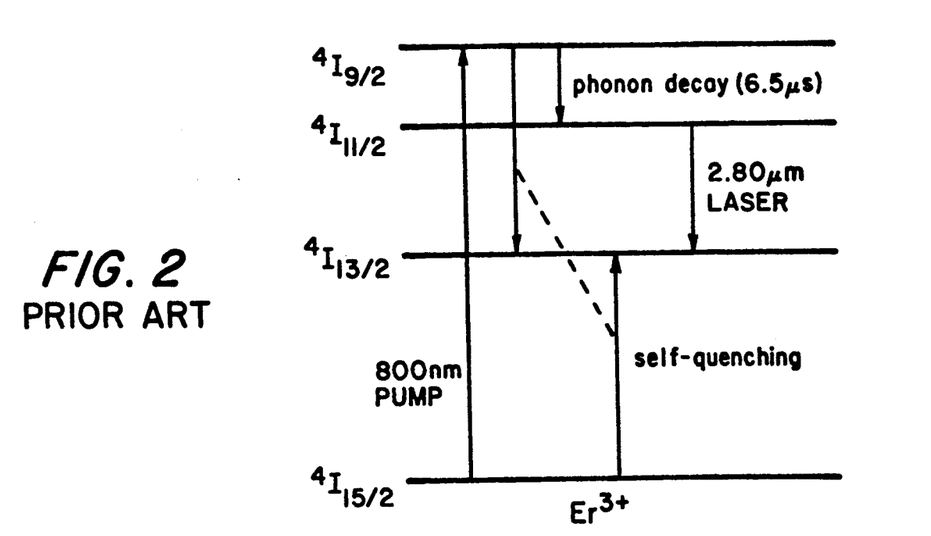
FIG. 2 illustrates the $Er^{3+}$ concentration-dependent, self-quenching process of $^4I_{9/2} + ^4I_{15/2} \rightarrow ^4I_{13/2} + ^4I_{13/2}$.

Another loss mechanism that results in a still lower slope efficiency for the $Er^{3+}$ 800 nm resonant pumping scheme is illustrated in FIG. 2. Essentially, FIG. 2 illustrates the $Er^{3+}$ concentration-dependent self-quenching process $^4I_{9/2} \rightarrow {}^4I_{15/2} \rightarrow {}^4I_{13/2} + {}^4I_{13/2}$. The non-radiative self-quenching process $^4I_{9/2} \rightarrow {}^4I_{15/2} \rightarrow {}^4I_{13/2} + {}^4I_{13/2}$ bypasses the $^4I_{11/2}$ upper laser state and leads to a reduction in the pumping efficiency of the 800 nm-pumped 2.8 micron $Er^{3+}$ laser. This self-quenching process is a phonon-assisted dipole-dipole interaction between nearby $Er^{3+}$ ions in the crystal lattice. The probability for the occurrence of the self-quenching process increases at higher $Er^{3+}$ concentrations due to the stronger dipole-dipole interaction for smaller separation between $Er^{3+}$ ions. Therefore, the lifetime of the $^4I_{9/2}$ state decreases at higher concentrations.

Figure 3:
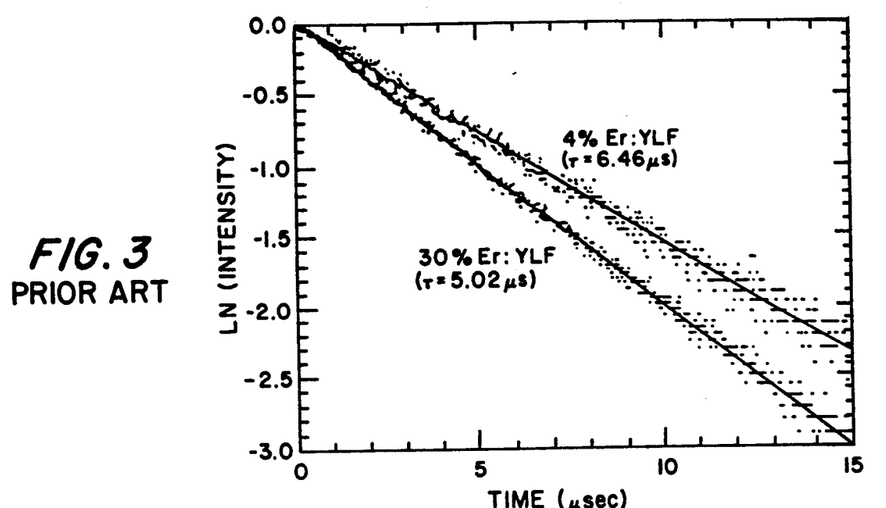
FIG. 3 illustrates the fluorescence decay from the $^4I_{9/2}$ state for 4% and 30% $Er^{3+}$ concentrations in YLF.

FIG. 3 illustrates the fluorescence decay from the $^4I_{9/2}$ state 4% and 30% concentrations of $Er^{3+}$ in YLF (yttrium lithium fluoride), i.e., $LiYF_4$, crystal host. The natural logarithm of the fluorescence intensity is shown plotted against time. The $^4I_{9/2}$ state is excited by a pulsed dye laser having a pulse duration ($\approx$ 10 nanoseconds) significantly shorter than the $^4I_{9/2}$ lifetime. The $^4I_{9/2}$ lifetimes are obtained from a linear least-squares fit (the solid lines in FIG. 3) to the fluorescence data. Similar fluorescence decay data are obtained for two intermediate $Er^{3+}$ concentrations, 8% and 16%, in the YLF crystal host. The $^4I_{9/2}$ lifetimes for the 4%, 8%, 16% and 30% concentrations are given in the following TABLE 1.

TABLE 1

| $Er^{3+}$ CONCENTRATION | $^4I_{9/2}$ LIFETIME | PUMPING EFFICIENCY |
|---|---|---|
| 4% | 6.46 μs | 100% |
| 8% | 6.39 μs | 99% |
| 16% | 6.10 μs | 94% |
| 30% | 5.02 μs | 78% |

The $^4I_{9/2}$ lifetimes for the 4% and 8% samples are very nearly the same, implying that for the 4% $Er^{3+}$, the $^4I_{9/2}$ decay is due almost entirely to phonon decay to the $^4I_{11/2}$ upper laser state. (The radiative decay rate from the $^4I_{9/2}$ state is negligible compared to the phonon decay rate.) The pumping efficiency for populating the $^4I_{11/2}$ upper laser state is given by $\tau(C)\tau'(0)$, where $\tau(C)$ is the $^4I_{9/2}$ lifetime for $Er^{3+}$ concentration C, and $\tau(0)$ is the limiting value of the $^4I_{9/2}$ lifetime for an arbitrarily small $Er^{3+}$ concentration 0. That is, $\tau(0)$ is due to purely phonon decay. Since $\tau(4\%) \approx \tau(8\%)$, it can be assumed that $\tau(0) \approx \tau(4\%)$. Using this approximation, the pumping efficiencies $\tau(C)/\tau(0)$ for populating the $^4I_{11/2}$ upper laser state are given in the above TABLE 1.

The maximum possible slope efficiency for the 800 nm-pumped 2.8 micron $Er^{3+}$:YLF laser with $Er^{3+}$ concentration C is $(\tau(C)/\tau(0))(\lambda_{pump}/\lambda_{laser})$. From TABLE 1, the maximum possible slope efficiency for the 800 nm pumping scheme of FIG. 1 is therefore 22% for an $Er^{3+}$ concentration of 30%.

TABLE 1 also shows that the reduced efficiency for the 800 nm-pumped 2.8 micron laser due to the self-quenching process (previously discussed in relation to FIG. 2) can be avoided by using a low $Er^{3+}$ concentration. However, this approach is not suitable for the cw- (continuous wave) pumped 2.8 micron $Er^{3+}$ laser due to the importance of the upconversion process $^4I_{13/2} \rightarrow {}^4I_{13/2} \rightarrow {}^4I_{9/2} + {}^4I_{15/2}$ for cw operation of the $^4I_{11/2} \rightarrow {}^4I_{13/2}$ transition. This transition is nominally self-terminating due to the long lifetime (13.2 milliseconds or ms) of the $^4I_{13/2}$ lower laser state relative to the lifetime (4.2 ms) of the $^4I_{11/2}$ upper laser state. The upconversion process $^4I_{13/2} \rightarrow {}^4I_{13/2} \rightarrow {}^4I_{15/2}$, which is the inverse of the self-quenching process and is therefore increasingly efficient for higher $Er^{3+}$ concentrations, effectively reduces the lower laser state lifetime and allows cw operation of the otherwise self-terminated 2.8 micron laser transition. This effect has been demonstrated for the cw-pumped 2.8 micron $Er^{3+}$:YLF laser, for which a slope efficiency of 0.7% was obtained for an 8% $Er^{3+}$ concentration (See "CW and Pulsed 2.8 μm Laser Emission from Diode-Pumped $Er^{3+}$:LiYF$_4$ at Room Temperature" by G.J. Kintz, R. Allen, and L. Esterowitz, Appl. Phys. Letts., Vol. 50 (22), pp. 1553-1555 (Jun. 1, 1987)), and a 10% slope efficiency was obtained for a 30% $Er^{3+}$ concentration (See U.S. Pat. No. 5,014,279). This fundamental trade-off, i.e. higher cw efficiency due to the effective reduction in the lower laser state lifetime via the upconversion process for higher $Er^{3+}$ concentration, and lower efficiency due to the self-quenching loss for higher $Er^{3+}$ concentration, can not be avoided in the 800 nm pumping scheme.

Figure 4:
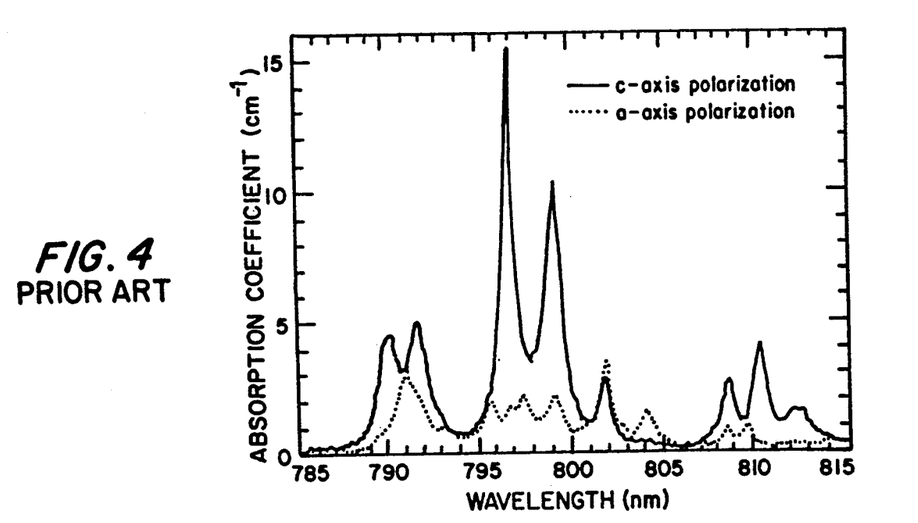
FIG. 4 illustrates the polarized absorption spectrum for 30% $Er^{3+}$:YLF in the 800 nm region.

FIG. 4 illustrates the polarized absorption spectrum for a 30% $Er^{3+}$:YLF in the 800 nm region. Since YLF is a uniaxial crystal, the absorption is shown for both the c-axis (the solid line) and the a-axis (the dotted line) polarizations. Note that the absorption spectrum in the 800 nm region is strongly polarized. The peak c-axis absorption is approximately five times stronger than the peak a-axis absorption. As a result of this weak a-axis absorption in the 800 nm region, a polarization-coupled beam-combining pumping scheme can not be employed in the 800 nm region.

Also note the narrowness of the absorption spectrum for both polarizations in the 800 nm region. The strongest c-axis absorption peaks in the 800 nm region have a width of only 1 nm (FWHM or full width at half maximum). This limits wavelength selection, i.e., the wavelength and the wavelength width of the pump beam. Moreover, because the absorption peaks are extremely steep, a slight deviation in the wavelength of the pump beam will cause a large change in the absorption of the pump beam into the YLF crystal host, and consequently, unstable laser output. Thus, control of the temperature of the pump laser is demanding for $Er^{3+}$:YLF laser, because temperature change will cause a deviation in the wavelength of the pump beam and therefore also change the absorption of the pump beam into the YLF crystal host.

The $Er^{3+}$:YLF laser suffers from several additional problems. For example, the YLF crystal host is brittle, and tends to crack when pumped at high power levels. However, the greatest drawback of the YLF crystal host is that it does not recycle the energy, which limits its slope efficiency.

OBJECTS OF THE INVENTION

Accordingly, one object of the invention is to efficiently generate a laser emission at a wavelength of substantially 2.8 microns that recycles the energy, resulting in a significantly (more than a factor of 2) higher slope efficiency than previously demonstrated at or near room temperature.

Another object of the invention is to provide a resonantly pumped, 2.8 micron solid state laser system that has a crystal host that is less brittle than a YLF crystal host.

Another object of the invention is to provide a resonantly pumped, 2.8 micron solid state laser system having a crystal host that is less likely to crack than a YLF crystal host when pumped at high power levels.

Another object of the invention is to provide a resonantly pumped, 2.8 micron solid state laser system having an erbium-doped crystal host that has a broad, smooth absorption spectrum.

Another object of the invention is to provide a resonantly pumped, 2.8 micron solid state laser system with a slope efficiency greater than that of an $Er^{3+}$:YLF laser system by increasing the effectiveness of the upconversion process $^4I_{13/2} \rightarrow {}^4I_{13/2} \rightarrow {}^4I_{9/2} + {}^{40}I_{15/2}$.

Another object of the invention is to provide a resonantly pumped, 2.8 micron solid state laser system with a greater than unity quantum efficiency.

Another object of the invention is to provide a resonantly pumped, 2.8 micron solid state laser system having a 36% slope efficiency.

Another object of the invention is to provide a continuous wave, laser diode pumped, erbium-doped, GSGG, solid state laser system for producing a continuous wave laser emission at a wavelength of substantially 2.8 microns.

A further object of the invention is to provide a resonantly pumped, $Er^{3+}$-doped, GSGG, solid state laser system for directly pumping the $^4I_{11/2}$ upper laser state of the $Er^{3+}$ with a pump beam at a wavelength of about 970 nm to cause the $Er^{3+}$-doped, GSGG laser to produce a laser emission corresponding to the $^4I_{11/2} \rightarrow {}^4I_{13/2}$ laser transition and having a wavelength of substantially 2.8 microns.

SUMMARY OF THE INVENTION

These and other objects of the invention are achieved by providing a resonantly pumped, solid state laser system which comprises a laser cavity defined by first and second reflective elements, a crystal disposed in the laser cavity and having a GSGG host material doped with a preselected concentration of erbium, and a resonant pumping means for directly pumping the $^4I_{11/2}$ upper laser state of the erbium with a pump beam at a wavelength of between about 960 nm and about 985 nm to cause the erbium-doped, GSGG laser to produce a laser emission corresponding to the $^4I_{11/2} \rightarrow {}^4I_{13/2}$ laser transition having a wavelength of substantially 2.8 microns. The combination of the GSGG host material and the preselected concentration of erbium will produce a recycling process that produces an internal quantum efficiency of at least unity and a slope efficiency of about 36% when the crystal is resonantly pumped. The resonant pumping means can be, for example, at least one InGaAs laser diode or a Ti:Sapphire pump laser.

BRIEF DESCRIPTION OF THE DRAWINGS

These and other objects, features and advantages of the invention, as well as the invention itself, will become better understood with reference to the following detailed description when considered in connection with the accompanying drawings, wherein like reference numerals designate identical or corresponding parts throughout the several views and wherein.

DETAILED DESCRIPTION OF THE PREFERRED EMBODIMENT

As stated before, the invention is a resonantly pumped, solid state laser system which comprises an erbium-doped, 2.8 micron, GSGG, solid state laser and a resonant pumping means for directly pumping the $^4I_{11/2}$ upper laser state of the erbium with a pump beam at a wavelength of about 970 nm to cause the erbium-doped laser to produce a laser emission corresponding to the $^4I_{11/2} \rightarrow ^4I_{13/2}$ laser transition having a wavelength of substantially 2.8 microns.

Figure 5:
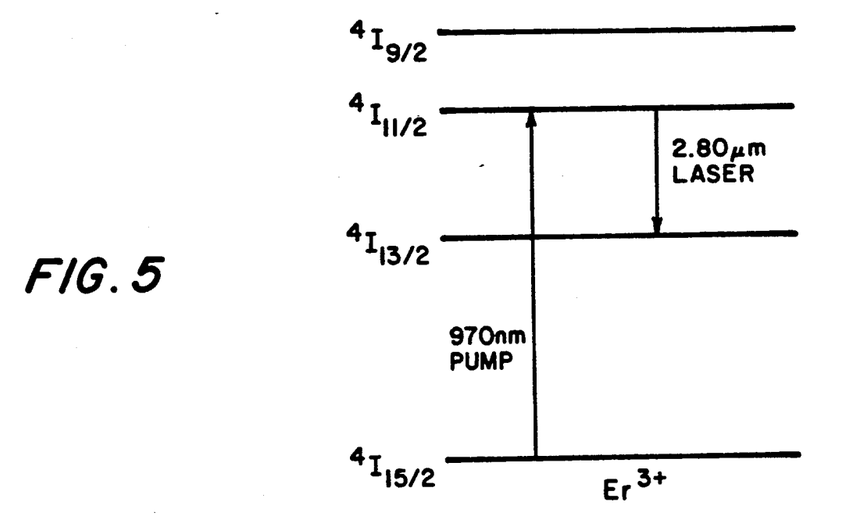
FIG. 5 illustrates the 970 nm resonant pumping diagram for a 2.8 micron $Er^{3+}$ laser with a $^4I_{11/2} \rightarrow ^4I_{13/2}$ laser transition.

FIG. 5 illustrates the 970 nm resonant pumping diagram for a 2.8 micron $Er^{3+}$ laser with a $^4I_{11/2} \rightarrow ^4I_{13/2}$ laser transition. As shown in FIG. 5, the $^4I_{11/2}$ upper laser state is pumped directly by a 970 nm pump beam. Direct pumping of the $^4I_{11/2}$ upper laser state avoids the various non-radiative loss mechanisms in the $Er^{3+}$ to the greatest extent possible. For example, the 800 nm pumping scheme suffers from two non-radiative losses which are not present in the direct scheme. First, the $^4I_{9/2} \rightarrow ^4I_{11/2}$ phonon decay is an inherent loss in the 800 nm pumping scheme, which is avoided with direct pumping into the $^4I_{11/2}$ upper laser state. Second, the $^4I_{9/2} + ^4I_{15/2} \rightarrow ^4I_{13/2} + ^4I_{13/2}$ non-radiative self-quenching process (shown in FIG. 1) competes with the $^4I_{9/2} \rightarrow ^4I_{11/2}$ phonon decay. When an ion in the $^4I_{9/2}$ state decays via the non-radiative self-quenching process, the $^4I_{11/2}$ upper laser state is bypassed. This loss odes not occur when the $^4I_{11/2}$ upper laser state is pumped directly.

The theoretical maximum possible slope efficiency for a 2.8 micron laser pumped by this 970 nm resonant pumping scheme of FIG. 5 is given by $\lambda_{pump}/\lambda_{laser} = 35\%$, while the theoretical maximum possible slope efficiency for a 2.8 micron laser pumped by the previously discussed 800 nm resonant pumping scheme of FIG. 1 is 28%.

The theoretical maximum possible slope efficiency for a 2.8 micron laser pumped by this 970 nm resonant pumping scheme of FIG. 5 is further increased by using a GSGG crystal host having a low Debye temperature (less than 520° K.). Debye temperature is the temperature $\theta$ arising in the computation of the Debye specific heat, defined by $k\theta = h\nu$, where k is the Boltzmann constant, h is Planck's constant, and $\nu$ is the Debye frequency.

Figure 6:
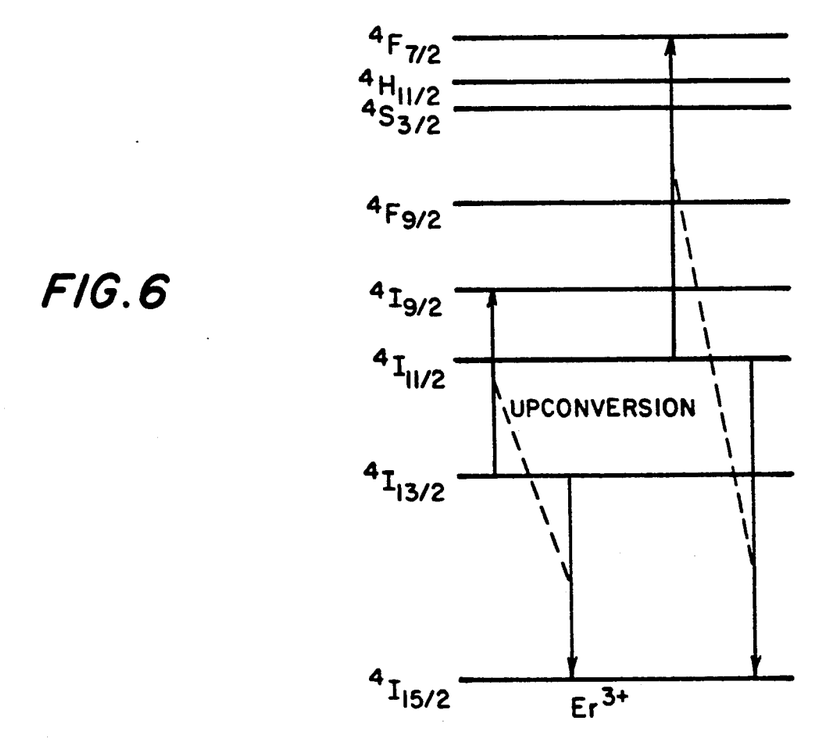
FIG. 6 illustrates the first upconversion process $^4I_{13/2} + ^4I_{13/2} \rightarrow ^4I_{9/2} + ^4I_{15/2}$ and the second upconversion process $^4I_{11/2} + ^4I_{11/2} \rightarrow ^4F_{7/2} + ^4I_{15/2}$ for $Er^{3+}$.

FIG. 6 illustrates the first upconversion process $^4I_{13/2} + ^4I_{13/2} \rightarrow ^4I_{9/2} + ^4I_{15/2}$ and the second upconversion process $^4I_{11/2} + ^4I_{11/2} \rightarrow ^4F_{7/2} + ^4I_{15/2}$ for $Er^{3+}$. As discussed above, the theoretical maximum possible slope efficiency for a 2.8 micron laser pumped by the 970 nm resident pumping scheme of FIG. 5 is given by $\lambda_{pump}/\lambda_{laser} = 35\%$. However, as discussed below, providing a crystal host, such as GSGG, having a low Debye temperature makes it possible to approach and exceed the theoretical maximum possible slope efficiency.

The excess in the maximum possible slope efficiency results from recycling of population out of the $^4I_{13/2}$ lower laser state via the first upconversion process $^4I_{13/2} + ^4I_{13/2} \rightarrow ^4I_{9/2} + ^4I_{15/2}$. Crystal hosts having low Debye temperatures, such as GSGG, have a greater effectiveness of upconversion pumping as compared to crystal hosts having high Debye temperatures, such as YLF.

Figure 7:
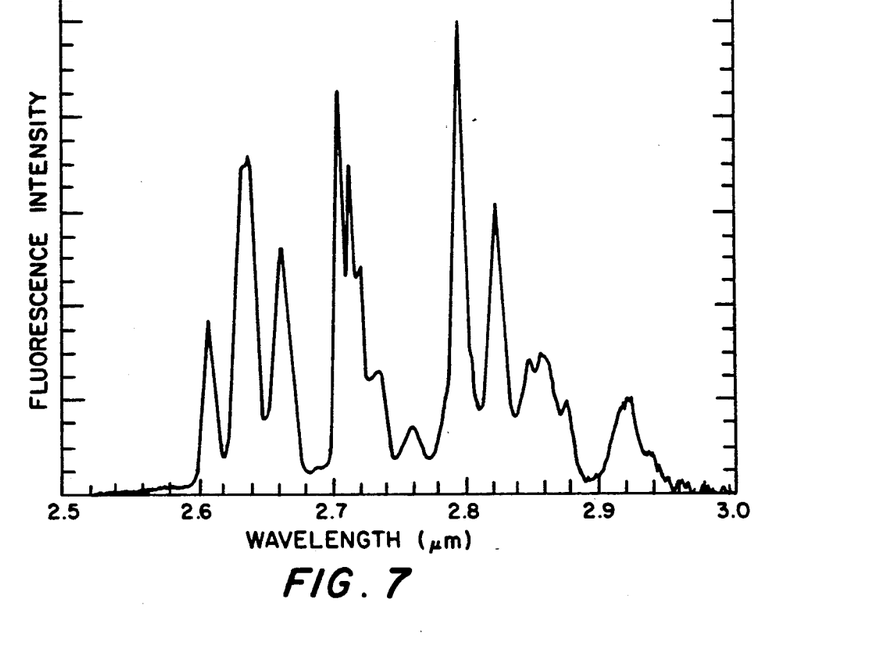
FIG. 7 illustrates the fluorescence spectrum for the $^4I_{11/2} \rightarrow ^4I_{13/2}$ laser transition in 30% $Er^{3+}$:GSGG.

FIG. 7 illustrates the fluorescence spectrum for the $^4I_{11/2} \rightarrow ^4I_{13/2}$ laser transition in 30% $Er^{3+}$:GSGG. The fluorescence spectrum is corrected for the overall response of the detection system by calibration against a black body source of known temperature.

Figure 8:
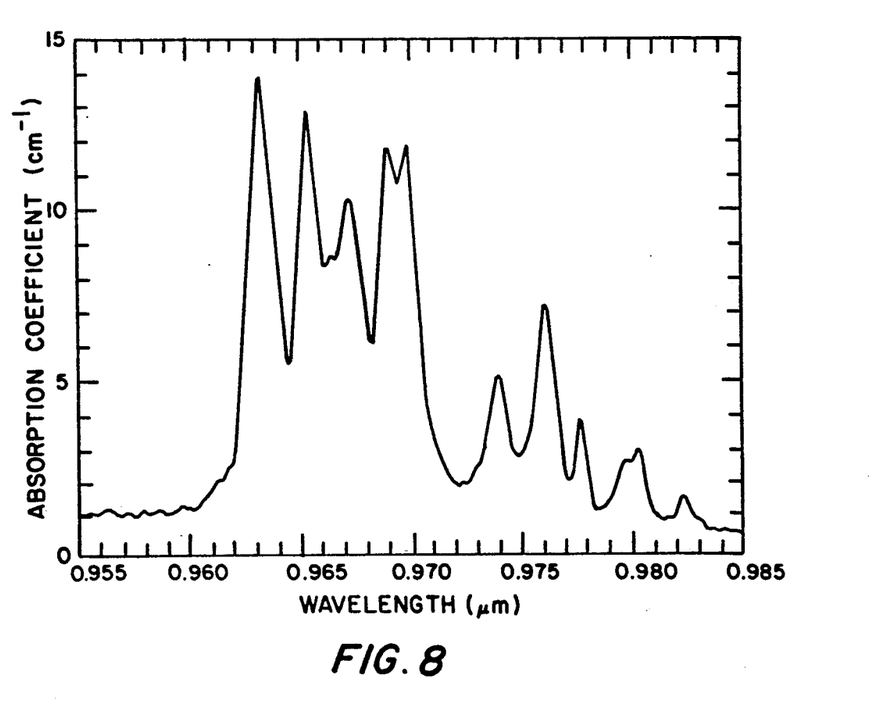
FIG. 8 illustrates the absorption spectrum for 30% $Er^{3+}$:GSGG in the 970 nm region.

FIG. 8 illustrates the absorption spectrum for 30% $Er^{3+}$:GSGG in the 970 nm region. The absorption spectrum for 30% $Er^{3+}$:GSGG in the 970 nm region of FIG. 8 has several advantages over the absorption spectrum for 30% $Er^{3+}$:YLF in the 800 nm region of FIG. 4.

A first advantage to the absorption spectrum for 30% $Er^{3+}$:GSGG is that there are several absorption peaks between 960 nm and 980 nm. Consequently, a pump beam having a broad or narrow wavelength range can be used.

A second advantage of the absorption spectrum for 30% $Er^{3+}$:GSGG lies in the broad character of the primary absorption feature between 962 nm and 971 nm. The width of this primary absorption feature is broader than 7 nm (FWHM). In contrast, the strongest c-axis absorption peaks for 30% $Er^{3+}$:YLF in the 800 nm region have a width of only 1 nm (FWHM), as shown in FIG. 4. Because of the broad character of the primary absorption feature of 30% $Er^{3+}$:GSGG, control of the pump laser temperature is less demanding than in the case of the 30% $Er^{3+}$:YLF, where the absorption peaks are narrow.

Figure 9:
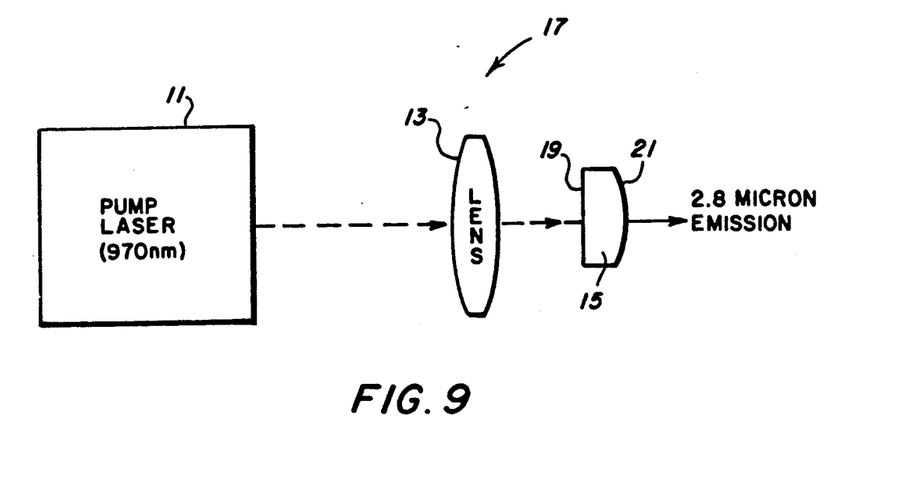
FIG. 9 illustrates a preferred embodiment of the invention.

Referring now to FIG. 9, a preferred embodiment of the invention is shown. In FIG. 9, a pump laser 11 transmits a cw pump beam at a wavelength of substantially 970 nm. This 970 nm pump beam is longitudinally focused by an optical system 13 into an erbium-doped, gadolinium scandium gallium garnet ($Er^{3+}$:GSGG)

crystal 15 of a solid state laser 17 to resonantly pump the Er$^{3+}$:GSGG crystal 15. In response to the 970 nm pumping, the Er$^{3+}$:GSGG crystal 15 produces an output cw laser emission at substantially 2.8 microns with a high slope efficiency.

Pump laser 11 can comprise one or more single lasers, or even one or more laser diode arrays, with each laser diode preferably being a strained-layer indium gallium arsenide (InGaAs) diode for providing a laser emission at a wavelength of substantially 970 nm. Strained-layer InGaAs diode lasers have been shown to have lower threshold current densities and to be less susceptible to damage than AlGaAs diode lasers. In addition, pump laser 11 can be a Ti:Sapphire (titanium sapphire) pump laser, or any other suitable optical laser source for producing a pump beam having a wavelength between 960 nm and 980 nm, preferably between 962 nm and 971 nm, and more preferably 970 nm.

Optical system 13, which can be a focusing lens or other suitable optical arrangement, is utilized to collect and focus the pump beam from pump laser 11 to crystal 15 to essentially match the 970 nm pump beam to the cavity mode of the Er$^{3+}$:GSGG crystal 15. Optical system 13 may have a focal length of 2.5 cm, for example.

The Er$^{3+}$:GSGG crystal 15 is a 30% erbium-doped Gd$_3$Sc$_2$Ga$_3$O$_{12}$ crystal, 3 mm long, with high reflectivity coatings (not shown) on opposite front and back end surfaces 19 and 21, respectively, of the Er$^{3+}$:GSGG crystal 15 to form a monolithic laser cavity (not shown). The front end surface 19 of Er$^{3+}$:GSGG crystal 15 is flat and is high reflectivity- (HR) coated at the 2.8 micron laser wavelength and anti-reflectivity- (AR) coated at the 970 nm pump wavelength. Back surface 21 of Er$^{3+}$:GSGG crystal 15 is concave, with a 1 cm radius of curvature, and is the output coupler of the solid state laser 17 with a 99.7% reflectivity at 2.8 microns and 100% reflection for the 970 nm pumping. Alternatively, the Er$^{3+}$:GSGG crystal 15 and the reflective elements may be non-monolithic.

In the embodiment shown in FIG. 9, the gadolinium scandium gallium garnet (GSGG) material of Er$^{3+}$:GSGG crystal 15 forms the laser host material, or lasant material, which is doped with a 30% concentration of erbium, which is the activator material. Upon being pumped with the pump beam at the wavelength of 970 nm, Er$^{3+}$:GSGG crystal 15 produces a laser emission at substantially 2.8 microns with a slope efficiency of 36% (to be discussed). Er$^{3+}$:GSGG crystal 15 was grown from a melt of congruent composition containing 30% Er$^{3+}$. GSGG doped with Er$^{3+}$ is available from commercial sources such as Litton Airtron, Charlotte, NC and Union Carbide, Washougal, WA.

The Er$^{3+}$:GSGG crystal avoids several important problems suffered by the Er$^{3+}$:YLF crystal. The YLF crystal host is brittle, and tends to crack when pumped at high power levels. The GSGG host is a garnet, and is less subject to fracture and has a high thermal conductivity, and will therefore withstand significantly higher power levels than the YLF host. Most significantly, the GSGG host exhibits recycing while the YLF does not. This recycling in the GSGG host results in an appreciable improvement in efficiency for the GSGG host.

It should be noted at this time that experiments and calculations have indicated that the optimum percent concentration of the erbium activator (or erbium activator ions) is between 20% and 50% erbium in GSGG. By the use of the term "percent concentration of erbium activator ions", it is meant the percent of substitution of gadolinium ions in GSGG by the Er activator ions. For example, with a 30% concentration of erbium activator ions selected, erbium would replace 30% of gadolinium in the GSGG.

Figure 10:
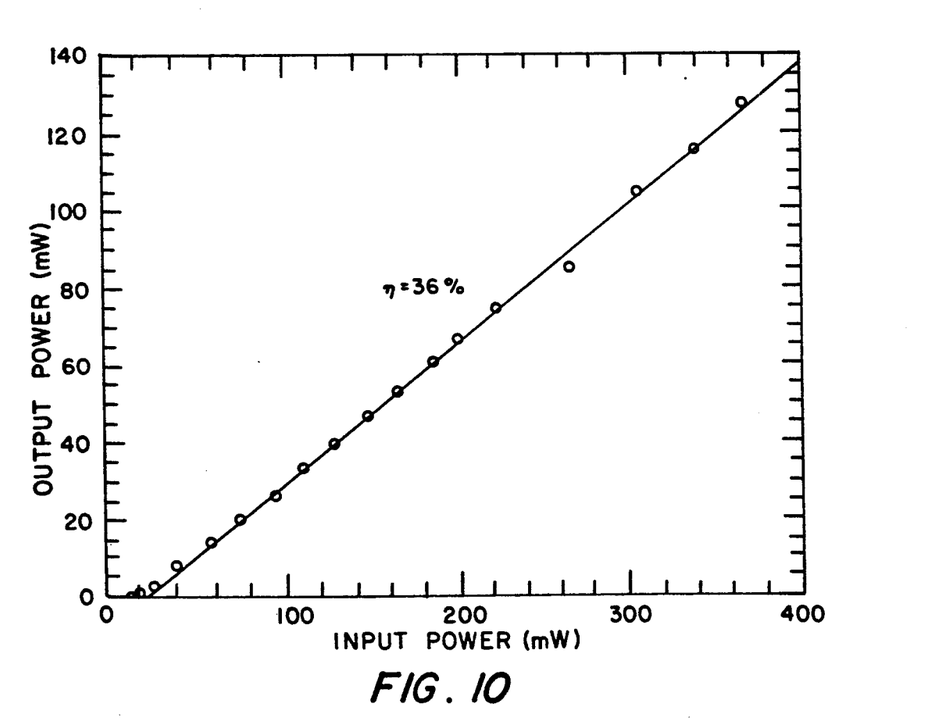
FIG. 10 illustrates an exemplary plot of the output power performance of the 970 nm-pumped, 2.8 micron, $Er^{3+}$:GSGG laser as a function of the 970 nm pump power.

The Er$^{3+}$:GSGG laser output is shown in FIG. 10 versus the incident 970 nm pump power. The slope efficiency is 36%, with a 10mW threshold. The laser wavelength is 2.795 microns, corresponding to the strongest fluorescence line in FIG. 7.

The 36% slope efficiency for the Er$^{3+}$:GSGG laser indicates a quantum efficiency $Q_p$ for populating the $^4I_{11/2}$ upper laser state slightly greater than unity ($Q_p$ = measured slope efficiency/theoretical maximum slope efficiency). Internal slope efficiencies, even for longitudinally pumped solid-state lasers, are rarely greater than 80% owing to cavity losses and imperfect mode-matching. The scattering loss $L_1$ and Fresnel loss $L_2$ for the GSGG laser cavity are estimated to total ($L=L_1+L_1$) no less than 0.1%. Given the output transmission T=0.3%, the internal slope efficiency can be no greater than 75% (T/(L+T)). Therefore, the internal quantum efficiency $\eta_i$ ($\eta_i=Q_p$/internal slope efficiency) for the Er$^{3+}$:GSGG laser is at least 1.3.

The quantum efficiency of the Er$^{3+}$ $^4I_{11/2}\rightarrow^4I_{13/2}$ laser can be modeled by considering the efficiencies of the quenching process (shown in FIG. 2) and upconversion process (shown in FIG. 6) relative to other decay processes. We define a quenching efficiency $\eta$ and an upconversion efficiency $\eta'$.

The quenching efficiency $\eta$ is defined as the fraction of the $^4I_{9/2}$ population wh decays via the $^4I_{9/2}+^4I_{15/2}$-$\rightarrow^4I_{13/2}+^4I_{13/2}$ non-radiative quenching process (shown in FIG. 2). The rate of radiative decay from the $^4I_{9/2}$ state is negligible compared to that of the phonon decay. That is, the non-radiative quenching and phonon decay processes completely describe the depopulation of the $^4I_{9/2}$ state. Therefore, $1-\eta$ is the fraction of the $^4I_{9/2}$ population which undergoes phonon decay. The quenching efficiency $\eta$ varies with the Er$^{3+}$ concentration for a given crystal host. The quenching efficiency $\eta$ is higher for larger concentrations, owing to the stronger dipole-dipole interaction for smaller interionic separations in the crystal lattice.

The upconversion efficiency $\eta'$ is defined as the fraction of the $^4I_{13/2}$ population which is depleted via a first upconversion process $^4I_{13/2}+^4I_{13/2}\rightarrow^4I_{9/2}+^4I_{15/2}$ of FIG. 6. The remainder decays radiatively to the ground state. Above laser threshold the decay of the $^4I_{11/2}$ upper laser state is dominated by stimulated emission. A second upconversion process, $^4I_{11/2}+^4I_{11/2}\rightarrow^4F_{7/2}+^4I_{15/2}$ (shown in FIG. 6), competes with stimulated emission in depopulating the $^4I_{11/2}$ upper laser state. For the purpose of a simple model, however, it can be assumed that this second upconversion process affects only the laser threshold and not the slope efficiency.

The quantum efficiency for directly pumping the $^4I_{11/2}$ upper laser state at 970 nm is $$Q11/2 = 1 + \tfrac{1}{2}\eta'[1-\eta+\tfrac{1}{2}\eta'(1+\eta)[...]], \qquad (1)$$

where [. . .] indicates that the contents of the square brackets are nested. The factors $\eta'/2$ signify that only half of the $^4I_{13/2}$ ions which take part in the upconversion interaction are recycled to the $^4I_{9/2}$ state. The factor $1+\eta$ results from the sum of $1-\eta$ ions which reach the $^4I_{11/2}$ upper laser state via phonon decay (and from there the $^4I_{13/2}$ lower laser state via stimulated emission), and $2\eta$ ions which reach the $^4I_{13/2}$ lower laser state via the quenching interaction, on the second cycle. The series in Equation (1) can be summed to yield $$Q_{11/2} = \frac{1 - \eta'\eta}{1 - \frac{1}{2}\eta'(1 + \eta)} \quad (2)$$

Similarly, the quantum efficiency for pumping the $^4I_{9/2}$ state at 800 nm is $$Q_{9/2} = 1 - \eta + \tfrac{1}{2}\eta'(1+\eta)[1 - \eta + \tfrac{1}{2}\eta'(1+\eta)[\cdots]] \quad (3)$$

Again the series can be summed, yielding in this case $$Q_{9/2} = \frac{1 - \eta}{1 - \frac{1}{2}\eta'(1 + \eta)} \quad (4)$$

Figure 11:
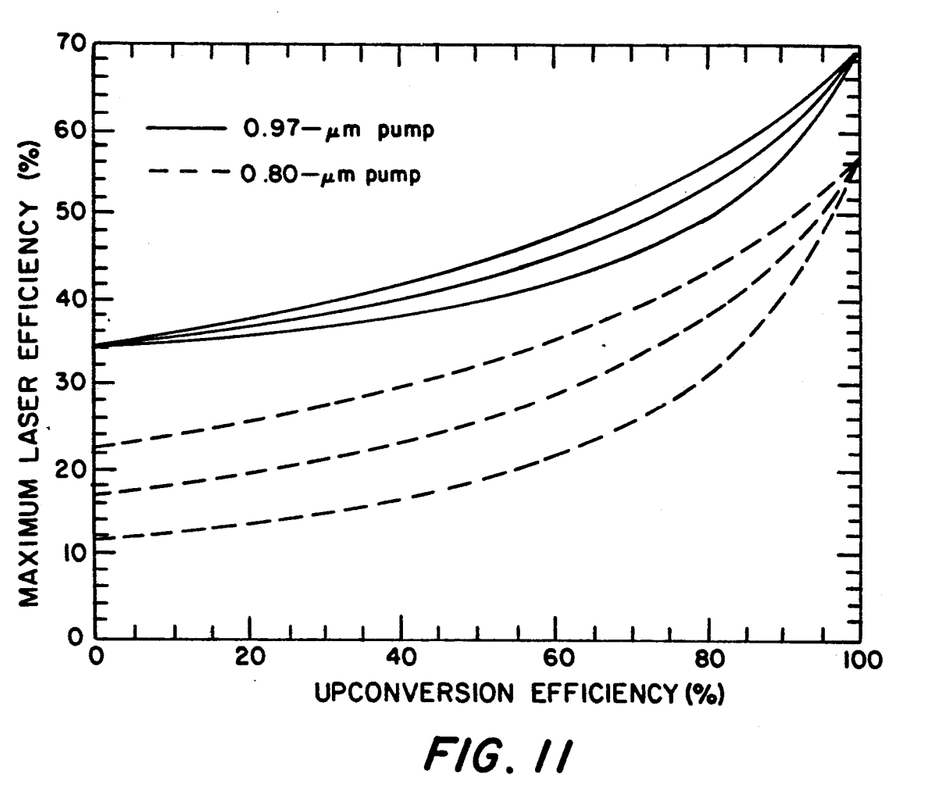
FIG. 11 illustrates an exemplary plot of the maximum possible laser efficiencies versus upconversion efficiency $\eta'$ predicted by the recycling model.

The maximum possible laser efficiencies implied by Equations (2) and (4) are plotted in FIG. 11 versus the upconversion efficiency $\eta'$. The plotted maximum possible laser efficiency values are $(\lambda_p/\lambda_l)Q_p$, where $\lambda_p$ is the pump wavelength, $\lambda_l=2.8$ micron is the laser wavelength, and $Q_p$ is the quantum efficiency. Curves are shown for three values of the quenching efficiency $\eta$ for both pumping schemes, i.e. 800 nm and 970 nm. For each pump wavelength, FIG. 11 plots quenching efficiency $\eta=20\%$ for the highest efficiency curve, quenching efficiency $\eta=40\%$ for the middle curve, and quenching efficiency $\eta=60\%$ for the lowest curve. The quenching efficiency $\eta$ depends only on the $Er^{3+}$ concentration for a given crystal host, while the upconversion efficiency $\eta'$ depends in addition on the laser parameters (e.g. output transmission). Assuming an internal slope efficiency of 75%, the 36% slope efficiency of the $Er^{3+}$:GSGG laser implies a maximum laser efficiency of 48% (maximum laser efficiency =slope efficiency/internal slope efficiency). From FIG. 11, a maximum laser efficiency of 48% implies an upconversion efficiency $\eta'$ of approximately 60% for 30% $Er^{3+}$:GSGG.

The recycling model addresses in a simple way the interactions among the non-radiative processes which affect the choice of parameters such as pump wavelength and $Er^{3+}$ concentration. The predictions of the simple model summarized in FIG. 11 are consistent with those of a more detailed model that applicants have developed which applies the mode overlap treatment of longitudinally pumped solid-state lasers to the rate equation analysis of the $Er^{3+}$ system (including upconversion from both the $^4I_{13/2}$ and $^4I_{11/2}$ laser states). The simple model presented here, however, provides a framework for visualizing the effects of the quenching and upconversion process without the complexity of the more detailed model.

FIG. 11 shows that the 970 nm direct pumping scheme is in all cases more efficient than the 800 nm pumping scheme. The direct scheme has the greatest advantage when the quenching efficiency $\eta$ is high, i.e. for high concentrations of $Er^{3+}$. This is an important consideration, because higher $Er^{3+}$ concentrations facilitate cw operation of the $^4I_{11/2} \to ^4I_{13/2}$ laser transition. The $^4I_{11/2} \to ^4I_{13/2}$ laser transition is nominally self-terminating owing to the $^4I_{13/2}$ long lower laser state lifetime (6.0ms) compared to the $^4I_{11/2}$ upper laser state lifetime (1.6ms). The first upconversion process $^4I_{13/2} + ^4I_{13/2} \to ^4I_{9/2} + ^4I_{15/2}$ shown in FIG. 6, which is more efficient at higher concentrations, mitigates the self-termination problem by effectively reducing the $^4I_{13/2}$ lower laser state lifetime. The minimum cw threshold will occur at moderate values of upconversion efficiency $\eta$ (typically less than 50%), however, because at higher values of upconversion efficiency $\eta'$ the second upconversion process $^4I_{11/2} + ^4I_{11/2} \to ^4F_{7/2} + ^4I_{15/2}$ begins to dominate. On the other hand, the slope efficiency for the 800 nm pumping scheme remains significantly lower than for the direct pumping scheme for values of upconversion efficiency $\eta'$ less than 50%. Therefore, the 970 nm direct pumping scheme allows greater flexibility in simultaneously optimizing upconversion efficiency $\eta'$ for low threshold and high slope efficiency.

Therefore, what has been described in a preferred embodiment of the invention is a resonantly pumped, erbium-doped, GSGG, 2.8 micron, solid state laser system that produces a recycling process which provides an internal quantum efficiency of at least unity and about a 36% slope efficiency when the erbium-doped GSGG host material in the laser crystal is resonantly pumped by a pump beam between about 960 nm and about 985 nm. This 36% slope efficiency is more than a factor of 2 better than a previously demonstrated 17% slop efficiency.

It should therefore readily be understood that many modifications and variations of the present invention are possible within the purview of the claimed invention. For example, other exemplary hosts that have low Debye temperatures and that could recycle the energy and produce quantum efficiencies greater than one (1), resulting in high laser slope efficiencies, are LaLuGaG ($La_2Lu_2Ga_3O_{12}$), YFeG ($Y_3Fe_2Fe_3O_{12}$) and GdFeG ($Gd_3Fe_2Fe_3O_{12}$). It is therefore to be understood that, within the scope of the appended claims, the invention may be practiced otherwise than as specifically described.

What is claimed and desired to be secured by letters patent of the United States is:

1. A laser system comprising:
   a crystal having a GSGG host material doped with a preselected percent concentration of erbium such that the combination of said GSGG host material and said preselected percent concentration of erbium will produce a recycling process that provides an internal quantum efficiency of at least unity when said crystal is resonantly pumped;
   a laser cavity defined by first and second reflective elements at opposing ends of said crystal to form a reflective path therebetween; and
   resonant pumping means for directly pumping the $^4I_{11/2}$ upper laser state of said erbium with a pump beam to cause said crystal to produce a laser emission corresponding to the $^4I_{11/2} \to ^4I_{13/2}$ laser transition having a wavelength of substantially 2.8 microns, said crystal producing the laser emission at a slope efficiency of at least 20%, one of said first and second reflective elements outputting a portion of said laser emission at substantially 2.8 microns.

2. The laser system of claim 1 wherein said resonant pumping means includes:
   at least one InGaAs laser diode for producing the pump beam at a preselected wavelength of approximately 970 nm.

3. The laser system of claim 1 wherein said resonant pumping means includes:

a Ti:Sapphire pump laser for producing said pump beam at a preselected wavelength of approximately 970 nm.

4. The laser system of claim 1 wherein:
said pump beam has a preselected wavelength between about 960 nm and about 985 nm.

5. The laser system of claim 4 wherein:
said preselected wavelength is between about 962 nm and about 971 nm.

6. The laser system of claim 5 wherein:
said preselected wavelength is about 970 nm.

7. The laser system of claim 1 wherein:
said crystal produces said laser emission at a slope efficiency of at least 20%.

8. The laser system of claim 1 wherein:
said crystal produces said laser emission at a slope efficiency of at least 28%.

9. The laser system of claim 1 wherein:
said crystal produces said laser emission at a slope efficiency of at least 36%.

10. The laser system of claim 1 wherein:
said GSGG host material is doped with a percent concentration of erbium between about 20% and about 50%.

11. The laser system of claim 10 wherein:
said percent concentration of erbium is about 30%.

12. The laser system of claim 1 further including:
optical means disposed between said resonant pumping means and said crystal for matching the pump beam to said crystal.

13. The laser system of claim 1 wherein:
said first reflective element has a high reflectance coating at the substantially 2.8 micron wavelength and an anti-reflective coating at a preselected wavelength of said pump beam; and
said second reflective element has a reflectivity of about 99.7% at 2.8 microns to output a portion of said laser emission at substantially 2.8 microns.

14. The laser system of claim 1 wherein:
said pump beam has a preselected wavelength of between about 960 nm and about 985;
said GSGG host material is doped with a percent concentration of erbium of about 30%; and
said crystal produces said laser emission at a slope efficiency of at least 36%.

15. A laser system comprising:
a crystal having a low Debye temperature a host material doped with a preselected percent concentration of erbium such that the combination of said low Debye temperature host material and said preselected percent concentration of erbium will produce a recycling process that provides an internal quantum efficiency of at least unity when said crystal is resonantly pumped;
a laser cavity defined by first and second reflective elements at opposing ends of said crystal to form a reflective path therebetween;
resonant pumping means for directly pumping the $^4I_{11/2}$ upper laser state of said erbium with a pump beam to cause said crystal to produce a laser emission corresponding to the $^4I_{11/2} \rightarrow {}^4I_{13/2}$ laser transition having a wavelength of substantially 2.8 microns, said crystal producing the laser emission at a slope efficiency of at least 36%, one of said first and second reflective elements outputting a portion of said laser emission at substantially 2.8 microns.

16. A method for producing a laser emission at a wavelength of substantially 2.8 microns, said method comprising the steps of:
utilizing a crystal having a low Debye temperature host material doped with a preselected percent concentration of erbium;
defining a laser cavity by disposing first and second reflective elements at opposing ends of said crystal to form a reflective path therebetween;
resonantly directly pumping the $^4I_{11/2}$ upper laser state of said erbium with a pump beam to cause said crystal to produce a laser emission corresponding to the $^4I_{11/2} \rightarrow {}^4I_{13/2}$ laser transition having a wavelength of substantially 2.8 microns;
recycling from the $^4I_{13/2}$ lower laser state of the erbium by the $^4I_{13/2} + {}^4I_{13/2} \rightarrow {}^4I_{9/2} + {}^4I_{15/2}$ upconversion process to produce a quantum efficiency of at least unity and a slope efficiency of at least 28%; and
outputting a portion of the laser emission at substantially 2.8 microns from one of said first and second reflective elements.

17. The method of claim 16 wherein said resonantly directly pumping step includes the step of:
selecting the pump beam to have a wavelength of between about 960 nm and about 980 nm.

18. The method of claim 16 further including the steps of:
selecting GSGG as the host material; and
doping the GSGG host material with a predetermined percent concentration of erbium to cause the crystal to produce the laser emission at a slope efficiency of at least 36%.

19. The method of claim 18 wherein said doping step includes the step of:
doping the GSGG host material with approximately a 30% concentration of erbium to cause the crystal to produce the laser emission at a slope efficiency of at least 36%.

* * * * *